(12) United States Patent
Happel

(10) Patent No.: US 6,869,525 B1
(45) Date of Patent: Mar. 22, 2005

(54) STORM DRAIN FILTER SYSTEM

(76) Inventor: Henry Happel, 140 Ruby St., Rockledge, FL (US) 32955

(*) Notice: Subject to any disclaimer, the term of this patent is extended or adjusted under 35 U.S.C. 154(b) by 92 days.

(21) Appl. No.: 10/349,722

(22) Filed: Jan. 23, 2003

Related U.S. Application Data

(60) Provisional application No. 60/350,436, filed on Jan. 24, 2002.

(51) Int. Cl.$^7$ .................................................. E03F 5/14
(52) U.S. Cl. .................... 210/163; 210/265; 210/282; 210/532.2; 210/924; 404/4
(58) Field of Search .......................... 210/163, 164, 210/170, 242.2, 265, 282, 299, 532.1, 924; 404/4, 5

(56) References Cited

U.S. PATENT DOCUMENTS

| | | | |
|---|---|---|---|
| 2,432,203 A | * 12/1947 | Miller | 210/532.1 |
| 5,192,156 A | 3/1993 | Webb | |
| 5,284,580 A | 2/1994 | Shyh | |
| 5,575,925 A | 11/1996 | Logue, Jr. | |
| 5,632,889 A | 5/1997 | Tharp | |
| 5,643,445 A | 7/1997 | Billias et al. | |
| 5,650,065 A | 7/1997 | Sewell | |
| 5,720,574 A | * 2/1998 | Barella | 404/4 |
| 5,958,226 A | * 9/1999 | Fleischmann | 210/282 |
| 6,045,691 A | * 4/2000 | McDermott | 210/164 |
| 6,083,402 A | * 7/2000 | Butler | 210/265 |
| 6,099,723 A | * 8/2000 | Morris et al. | 210/170 |
| 6,217,757 B1 | * 4/2001 | Fleischmann | 210/163 |
| 6,270,663 B1 | 8/2001 | Happel | |
| 6,287,459 B1 | * 9/2001 | Williamson | 210/164 |
| 6,428,692 B2 | 8/2002 | Happel | |
| 6,623,633 B2 | * 9/2003 | McDermott et al. | 210/164 |

* cited by examiner

*Primary Examiner*—Christopher Upton
(74) *Attorney, Agent, or Firm*—William M. Hobby, III

(57) ABSTRACT

A storm drain filter system apparatus includes a skimmer tray having a sediment collection closed bottom and having an inlet side and an outlet side and a hydrocarbon absorbing boom. A plurality of boom support brackets each has a boom holding portion for holding the boom therein and a spacing arm extending from the boom holding portion and attached to one side of the skimmer tray to space the boom in the boom holding portion between the inlet side and the outlet side of the skimmer tray. The skimmer tray extends all or partly around the storm drain opening forming an open center area to allow overflow liquid to flow over the outlet side through the middle area. Sediment is collected in the bottom of the skimmer tray and the boom is supported spaced between the inlet and outlet side of the skimmer tray to capture hydrocarbons and liquid entering the skimmer tray. The liquid enters the skimmer tray on one side of the boom and out the other side of the boom. The boom is supported at the liquid level of the skimmer tray so that the liquid is forced therearound allowing the boom to collect the hydrocarbons and the sediment to settle in the bottom.

5 Claims, 3 Drawing Sheets

STORM DRAIN FILTER SYSTEM

This application claims the benefit of U.S. Provisional Application Ser. No. 60/350,436, filed Jan. 24, 2002.

BACKGROUND OF THE INVENTION

This application relates to a storm drain filter system which is placed beneath the grate of the entrance to a storm water catch basin and especially to a filter system which collects the entering storm water and filters out hydrocarbons, such as automobile oil, sand and debris, from the storm water to provide cleaner water to a storm drain pipe.

Ground water from heavy rains or melted snow is collected in storm sewer catch basins and flows into an underground storm drain or sewer line. The water flows into the basin through openings in a grate placed on top of the basin to prevent larger solids from entering the basin. Conventional storm sewer filters remove solids from the water before the water flows into the catch basin. These filters are sometimes made of a porous material and located at or above grade level. Filters may be placed horizontally on top of the grate or may be positioned vertically in a circle above grade level surrounding the grate. Water flows through the filter and into the catch basin while solids are captured by the filter.

One prior art U.S. patent for a storm sewer filter can be seen in the Logue, Jr. U.S. Pat. No. 5,575,925, for a storm sewer catch basin and filter having a removable filter for buried catch basins. The filter includes a bag located below grade level in the catch basin and looped flaps which extend above grade level to aid in the removal of the filter from the catch basin. The filter is held in place in the basin by a heavy grate which rests on top of the flaps. In the Webb U.S. Pat. No. 5,192,156, a drain apparatus for a liquid trap is provided for placement in the opening for catching a runoff liquid from a surface into a sewer through a passageway extending between the surface and the sewer and for forming a liquid barrier between the sewer and the surface to prevent the flow of gases from the sewer to the surface. The Shyh U.S. Pat. No. 5,284,580, is a refuge collecting frame for a drainage sewer which is placed beneath a cover of a sewer drainage opening to accumulate refuge and permit easy disposable of the refuge accumulated therein to prevent blockage of the sewer. The frame body is a rectangular frame structure having dimensions corresponding to the opening of a sewer drain and has a filtering net or porous board with a plurality of holes therein incorporated into each side and bottom of the frame. The Tharp U.S. Pat. No. 5,632,889, is a filter cartridge for separating liquid hydrocarbons from water. A cartridge is formed from perlite particles which have been expanded and treated. The cartridge is mounted and removed from a catch basin opening. The Sewell U.S. Pat. No. 5,650,065, is a skimmer cover for a dry well in a catch basin for placing in an opening in a storm water catch basin to prevent floatable materials, such as hydrocarbons from a motor vehicle, from entering the catch basin. The Billias et al. U.S. Pat. No. 5,643,445, is a removable storm water screen and overflow device which includes a debris removing screen basket and overflow apparatus for use in a storm collection sewer and includes a central panel with foldable wings in each side of the central panel and in which each wing can have an optional extension panel slidably attached to each wing by bolts and nuts through longitudinal slots.

The prior U.S. Pat. to Happel, No. 6,270,663, is for a storm drain filter system which is placed beneath the grate of the entrance to a storm water catch basin and especially to a filter system which collects the entering storm water and filters out hydrocarbons, such as automobile oil, sand and debris, such as grass clippings, from the storm water to provide a cleaner water to the storm pipe by passing the drainage water onto an oil filter boom and then into a container having fine screen filtered outlets in the bottom and coarser screen filters on the sides and having overflow openings near the top of the container.

SUMMARY OF THE INVENTION

A storm drain filter system apparatus includes a skimmer tray having a sediment collection closed bottom and having an inlet side and an outlet side and a hydrocarbon absorbing boom. A plurality of boom support brackets each has a boom holding portion for holding the boom therein and a spacing arm extending from the boom holding portion and attached to one side of the skimmer tray to space the boom in the boom holding portion between the inlet side and the outlet side of the skimmer tray. The skimming tray extends around the storm drain opening forming an open middle area to allow liquid to flow over the outlet side through the middle area. Sediment is collected in the bottom of the skimmer tray and the boom is supported spaced between the inlet and outlet side of the skimmer tray to capture hydrocarbons and liquid entering the skimmer tray. The liquid enters the skimmer tray on one side of the boom and enters the skimmer tray and flows around the boom. The boom is supported at the liquid level of the skimming tray so that the liquid is forced therearound allowing the boom to collect the hydrocarbons and the sediment to settle in the bottom.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
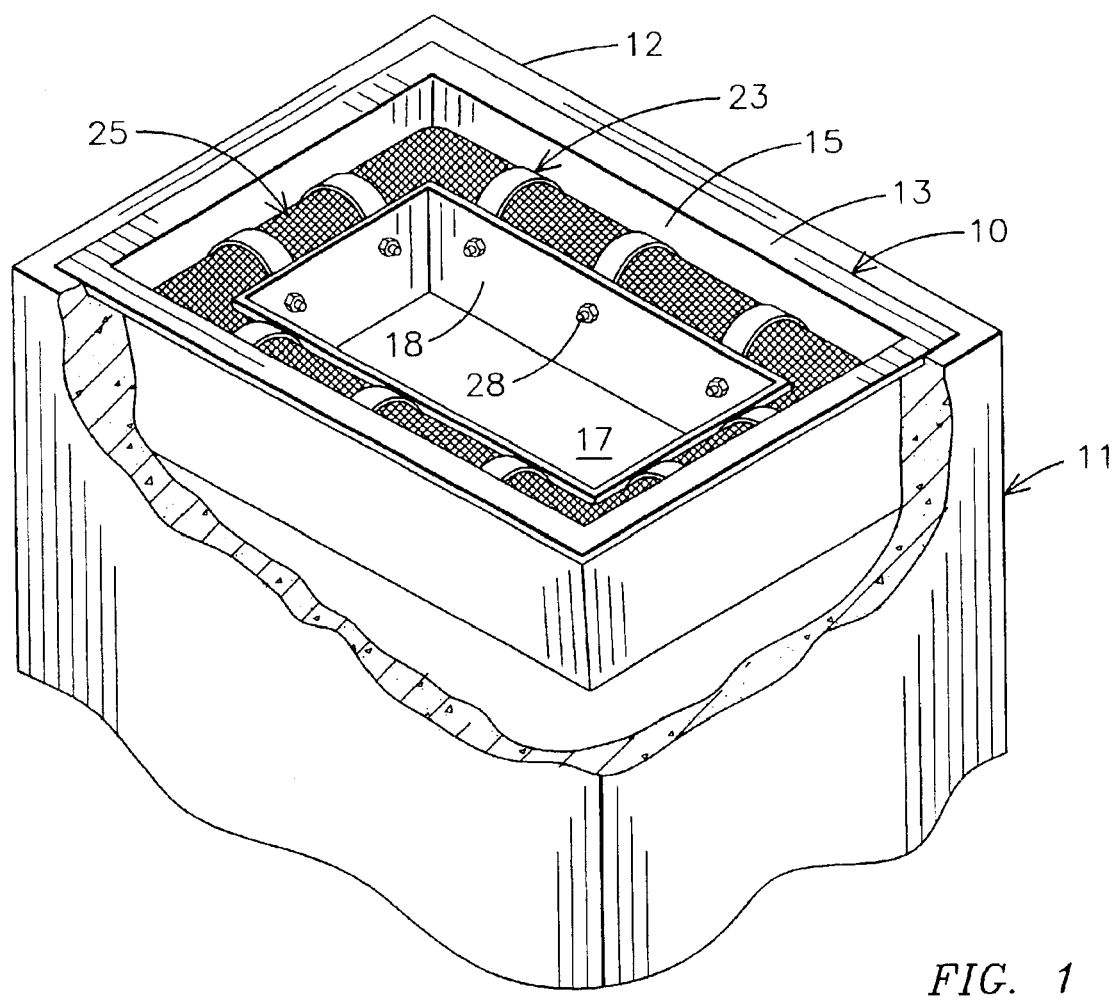
FIG. 1 is a cutaway perspective view of a storm drain skimmer attached in a concrete catch basin.
Figure 2:
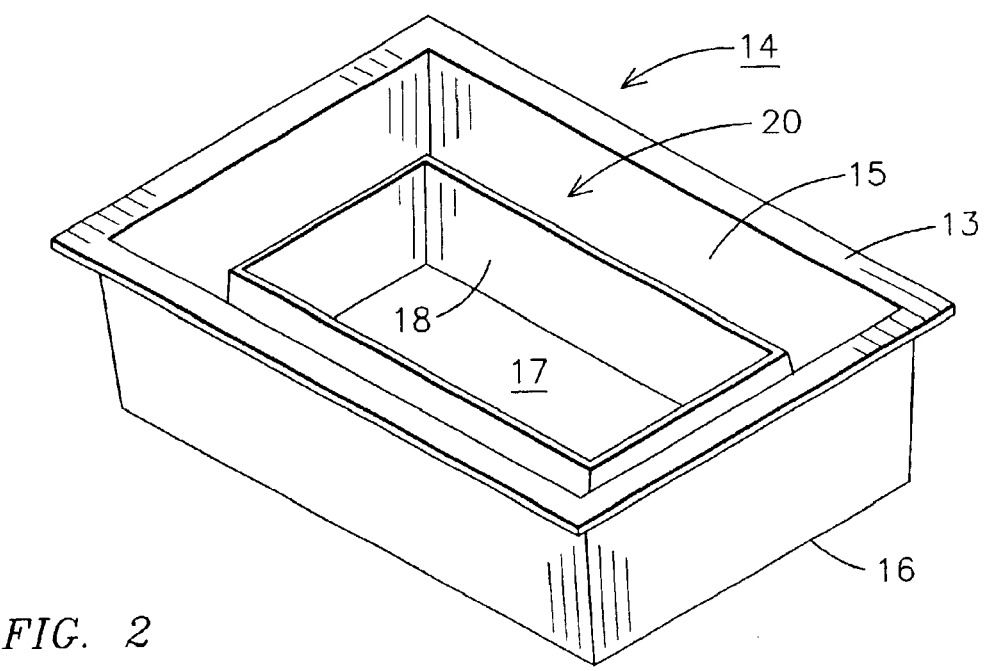
FIG. 2 is a perspective view of a skimmer tray of the skimmer of FIG. 1 without the absorbent skimmer boom.
Figure 3:
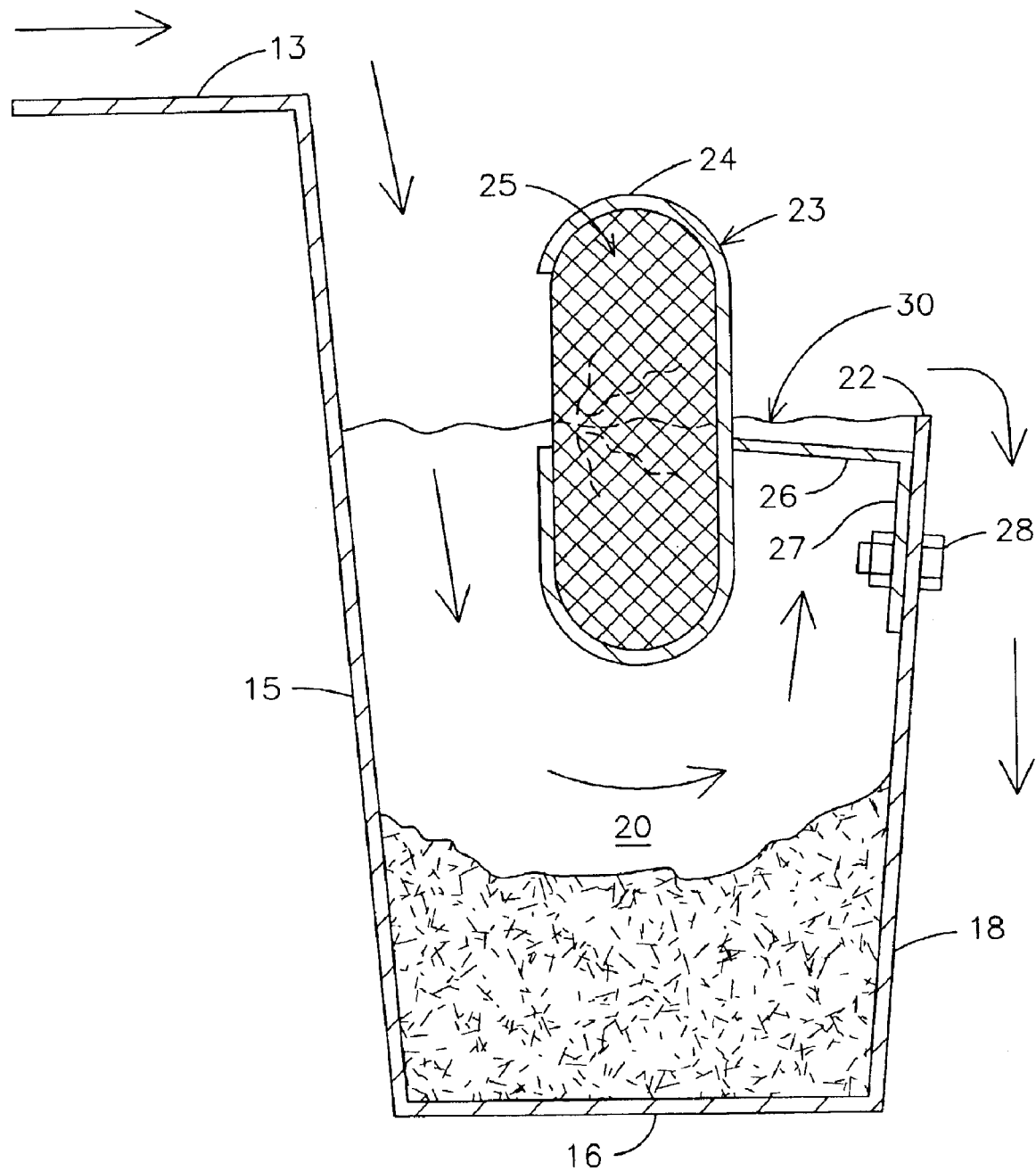
FIG. 3 is a sectional view taken through the storm drain skimmer in accordance with the present invention.

Referring to the drawings and especially to FIGS. 1–3, a storm drain filter system 10 is illustrated in FIG. 1 attached into a concrete catch basin 11 and supported on a catch basin ledge 12 with a peripheral flange 13. The filter 10 has a skimmer tray 14 having the peripheral supporting flange 13 along with a plurality of sides 15 and a bottom 16 and has a center opening 17 extending therethrough. A plurality of outlet walls 18 are attached to the bottom wall 16 which in turn is attached to the inlet sidewalls 15 to form a catch area 20 which can catch sediment 21, such as sand and debris and including grass clippings and run-off from streets and paved areas. The water flows into the skimmer tray 14, as shown in FIG. 3, where it falls to the bottom of the tray 20 where the sediment collects. The water flows over the edge 22 of the internal outlet wall 18, as shown by the arrows in FIG. 3. A plurality of boom supporting brackets 23 each have a generally C-shaped boom supporting or holding portion 24 for supporting a hydrocarbon absorbing boom 25 in each of the brackets 23. Each boom mounting bracket 23 has a spacing arm 26 having an attaching flange 27 which may be bolted with bolts 28 to the inside wall 18 as shown in FIG. 3.

In operation, the water flows, as shown by the arrows in FIG. 3, into the concrete catch basin 11 over the supporting flange 13 over the inlet side 15 and into the skimmer collection tray 14 collecting portion 20 where sediment 21, such as sand or the like, accumulates in the bottom thereof. As the water rises to a level indicated by the dots 30 and partially covers the boom 25, the floating hydrocarbons are absorbed by the boom. The water overflows the lip 22 of the outlet side 18 and through the open middle area 17 while the sediment 21 remains in skimmer tray 14 and with the hydrocarbons having been absorbed by the boom 25.

Figure 4:
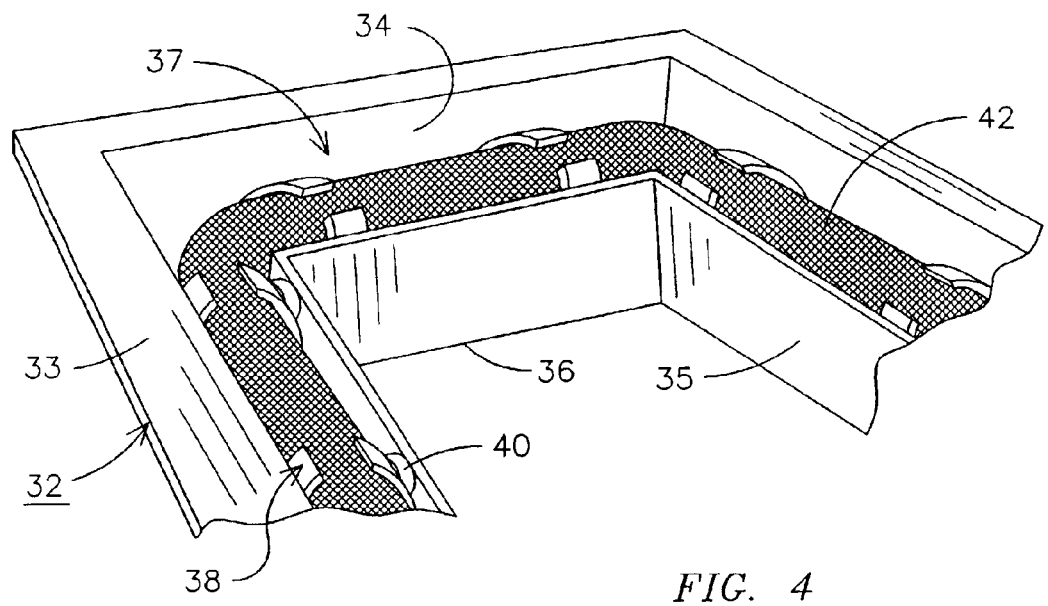
FIG. 4 is a perspective view of a modified skimmer in accordance with the present invention.
Figure 5:
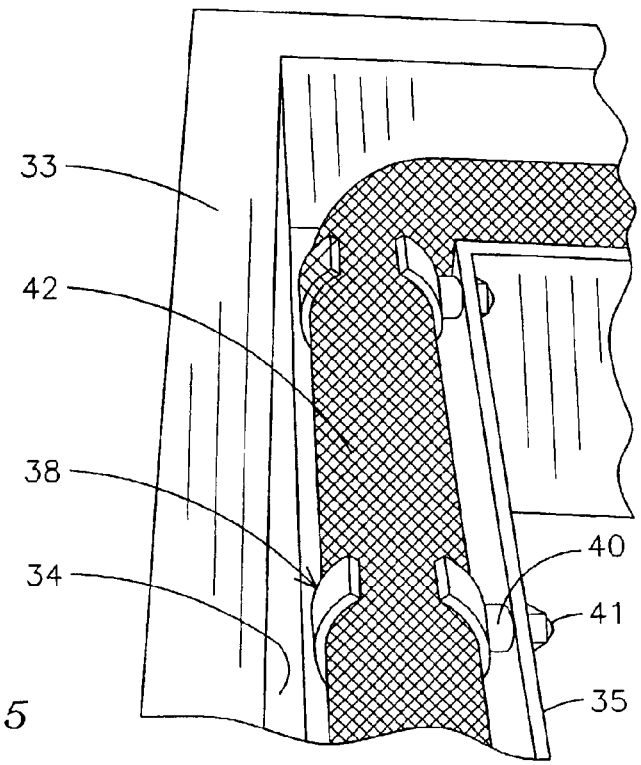
FIG. 5 is a partial perspective of the skimmer of FIG. 4.

As shown in FIGS. 4 and 5, a slightly modified embodiment of a skimmer tray 32 has a generally U-shape for fitting into a specific concrete catch basin entrance and has the supporting flanges 33 extending therearound having sidewalls 34 and outlet sidewalls 35 connected with a bottom 36 to form the collection tray portion 37. A plurality of boom mounting brackets 38 have spacers 40 for attaching the brackets 38 to the outlet walls 35 with nuts 41. The brackets 38, as seen in FIGS. 4 and 5, has a generally circular shape and an open top for attaching the boom 42 thereinto. This embodiment otherwise works in the same manner as that in connection with FIGS. 1–3.

It should be clear at this time that a storm drain skimmer for attaching to a concrete catch basin has been illustrated but it will also be clear that the present invention is not to be construed as limited to the forms shown which are to be considered as illustrative rather than restrictive.

I claim:

1. A storm drain filter system comprising:
   a skimmer tray having a sediment collection closed bottom and having an inlet side and outlet side;
   a hydrocarbon absorbing boom;
   a plurality of boom support brackets, each bracket having a generally "C" shaped boom holding portion for holding said boom therein and a spacing arm attached between said boom holding portion and one side of said skimmer tray to space a boom in said boom holding portion generally centered between said inlet side and outlet side of said skimmer tray to thereby divide said skimmer inlet and outlet sides; whereby sediment is collected in the bottom of said skimmer tray as storm water passes under said boom from said inlet side to said outlet side of said skimmer tray while capturing a hydrocarbons in liquid entering said skimmer tray.

2. A storm drain filter system in accordance with claim 1 in which said inlet side has a supporting flange thereon for supporting said skimmer tray in said storm drain.

3. A storm drain filter system in accordance with claim 2 in which each said spacing arm is attached to said outlet side at the liquid level of said filled skimmer tray.

4. A storm drain filter system in accordance with claim 1 in which said skimming tray extends around said storm drain opening forming an open center area to thereby allow overflow liquid to flow over said outlet side through the middle area.

5. A storm drain filter system in accordance with claim 4 in which said hydrocarbon absorbing boom is an elongated sock covered flexible boom.

* * * * *